(12) United States Patent
Truong et al.

(10) Patent No.: US 9,558,544 B2
(45) Date of Patent: Jan. 31, 2017

(54) METHOD AND APPARATUS FOR AUTHENTICATION OF A COIN OR OTHER MANUFACTURED ITEM

(75) Inventors: Hieu Truong, Ontario (CA); Yann Boutant, Chindrieux (FR)

(73) Assignees: MONNAIE ROYALE CANADIENNE/ROYAL CANADIAN MINT (CA); SIGNOPTIC TECHNOLOGIES (FR)

( * ) Notice: Subject to any disclaimer, the term of this patent is extended or adjusted under 35 U.S.C. 154(b) by 115 days.

(21) Appl. No.: 14/114,683

(22) PCT Filed: Apr. 20, 2012
(Under 37 CFR 1.47)

(86) PCT No.: PCT/CA2012/050255
§ 371 (c)(1),
(2), (4) Date: Mar. 4, 2014

(87) PCT Pub. No.: WO2012/145842
PCT Pub. Date: Nov. 1, 2012

(65) Prior Publication Data
US 2014/0355864 A1 Dec. 4, 2014

Related U.S. Application Data

(60) Provisional application No. 61/480,662, filed on Apr. 29, 2011.

(51) Int. Cl.
*G06T 7/00* (2006.01)
*G07D 5/00* (2006.01)
*G06K 9/62* (2006.01)

(52) U.S. Cl.
CPC .......... *G06T 7/0004* (2013.01); *G06K 9/6202* (2013.01); *G07D 5/005* (2013.01)

(58) Field of Classification Search
None
See application file for complete search history.

(56) References Cited

U.S. PATENT DOCUMENTS 4,899,392 A * 2/1990 Merton ................. G07D 5/005
 194/302
5,046,841 A 9/1991 Juds et al.
5,133,019 A 7/1992 Merton et al.
5,144,495 A 9/1992 Merton et al.
(Continued)

FOREIGN PATENT DOCUMENTS

CA 2033962 A1 8/1991
CN 1499435 A 5/2004
(Continued)

OTHER PUBLICATIONS

PCT Application No. PCT/CA2012/050255—IPRP Chapter II dated Aug. 20, 2013.
(Continued)

*Primary Examiner* — Bhavesh Mehta
*Assistant Examiner* — Narek Zohrabyan
(74) *Attorney, Agent, or Firm* — Polster Lieder

(57) ABSTRACT

A method includes: capturing an image of a coin, locating an acquisition area of the image using a landmark of the coin, the acquisition area comprising a feature unique to the coin and generating a digital representation of the acquisition area.

20 Claims, 9 Drawing Sheets

(56) References Cited

U.S. PATENT DOCUMENTS

| | | | |
|---|---|---|---|
| 5,216,234 A * | 6/1993 | Bell | G06K 7/14 |
| | | | 194/214 |
| 5,220,614 A | 6/1993 | Crain | |
| 6,305,523 B1 | 10/2001 | House et al. | |
| 6,325,197 B1 | 12/2001 | Furuya | |
| 6,685,000 B2 | 2/2004 | Sugata et al. | |
| 6,823,315 B1 | 11/2004 | Bucci et al. | |
| 6,871,788 B2 * | 3/2005 | Tompkin et al. | 235/487 |
| 7,469,828 B2 | 12/2008 | Baker et al. | |
| 7,871,000 B2 | 1/2011 | Baker et al. | |
| 7,916,281 B2 * | 3/2011 | Haddock | 356/71 |
| 8,090,952 B2 | 1/2012 | Harris | |
| 2002/0005329 A1 * | 1/2002 | Sugata | G07D 5/005 |
| | | | 194/302 |
| 2004/0022444 A1 | 2/2004 | Rhoads | |
| 2008/0230402 A1 | 9/2008 | Macor | |
| 2009/0080760 A1 * | 3/2009 | Knysh | G06K 9/00577 |
| | | | 382/141 |
| 2009/0083151 A1 * | 3/2009 | Urban | 705/14 |
| 2009/0110295 A1 | 4/2009 | Ogaki et al. | |
| 2009/0257619 A1 | 10/2009 | Boutant et al. | |
| 2010/0297027 A1 | 11/2010 | Loiret-Bernal et al. | |
| 2011/0095082 A1 | 4/2011 | Baker et al. | |
| 2011/0191590 A1 | 8/2011 | Darbellay et al. | |
| 2012/0273564 A1 | 11/2012 | Mercolino et al. | |
| 2015/0131890 A1 * | 5/2015 | Rourk | G06T 7/001 |

FOREIGN PATENT DOCUMENTS

| | | |
|---|---|---|
| EP | 0439669 A2 | 8/1991 |
| JP | 2003187289 A2 | 7/2003 |
| JP | 2003281593 A | 10/2003 |
| JP | 2004078478 A | 3/2004 |
| JP | 2005010581 A | 1/2005 |
| JP | 2006301881 A2 | 11/2006 |
| JP | 2003196657 A2 | 7/2007 |
| JP | 2009109419 A | 5/2009 |
| JP | 2010092435 A | 4/2010 |
| JP | 2010529798 A | 8/2010 |
| JP | 2012083964 A | 4/2012 |
| WO | 9429817 A1 | 12/1994 |
| WO | 2008152393 A1 | 12/2008 |
| WO | 2010121362 A1 | 10/2010 |
| WO | 2011110973 A2 | 9/2011 |
| WO | 2012145842 A1 | 11/2012 |

OTHER PUBLICATIONS

PCT Application No. PCT/CA2013/050333—International Search Report dated Sep. 23, 2013.
International Search Report for corresponding application PCT/CA2012/050255 mailed Jul. 10, 2012.
European Search Report, EP 12777030.3, Dec. 11, 2014.
Australian Government Patent Examination Report, AU 2012248087, Jul. 25, 2015.
Chinese Office Action, CN 201280032334.6, Aug. 3, 2015.
Japanese Office Action from corresponding Japanese Application No. P2014-506702 dated Mar. 1, 2016.
Taiwanese Office Action from corresponding Taiwanese Application No. 101114537 dated Jan. 18, 2016.
Chinese Office Action from corresponding Chinese Application No. 2012800323346 dated Apr. 26, 2016.
Singapore Written Opinion from corresponding Singapore application No. 11201505783Xdated Mar. 21, 2016.
Supplementary European Search Report for Application No. EP13872453, mailed on Sep. 28, 2016, 9 Pages.
Japanese Patent Application No. JP20150553991, Office Action dated Nov. 28, 2016.
Japanese Patent Application No. JP2014-506702, Office action dated Oct. 4, 2016.

* cited by examiner

METHOD AND APPARATUS FOR AUTHENTICATION OF A COIN OR OTHER MANUFACTURED ITEM

CROSS-REFERENCE TO RELATED APPLICATIONS

This application is a National Stage of International Application No. PCT/CA2012/050255, filed Apr. 20, 2012, which claimed priority to U.S. Provisional Patent Application No. 61/480,662, filed Apr. 29, 2011, the disclosures of the above applications are incorporated herein by reference.

TECHNICAL FIELD

The present application relates to authentication of a coin or other manufactured item for the purpose of identification, sorting, or quality control.

BACKGROUND DISCUSSION

Historically, coins have been recognized and differentiated by their appearance including coin dimensions, edge thickness, shape, color, serrations and engravings on obverse and reverse sides of the coin.

Coins may also be differentiated by their chemical composition. Vending machine coin acceptors generally rely on electromagnetic differences between coin materials to differentiate between types of coins by generating an electromagnetic signal as a coin passes through a pair of energized coils. The electromagnetic signal is analysed through a decomposition of the sinusoidal wave form of the electromagnetic signal into elements which may be related to diameter, thickness, and material magnetic characteristics. Many coin acceptors are unable to accurately differentiate between coins of different countries when the coins are made of the same alloy or the same family of alloys, such as bronze or brass. Further, many coin acceptors are unable to recognize plated steel coins.

SUMMARY

In an aspect, there is described herein a method including: capturing an image of a coin; locating an acquisition area of the image using a landmark of the coin, the acquisition area comprising a feature unique to the coin; and generating a digital representation of the acquisition area. The acquisition area may be the whole coin or part of the coin.

In another aspect, there is described herein an apparatus including: a light source; a device for capturing an image of a coin; a positioning device for maintaining a coin in position during image capture; a processor for receiving the image from the device, locating an acquisition area of the image using a landmark of the coin, the acquisition area comprising a feature unique to the coin; and generating a digital representation of the acquisition area. The acquisition area may be the whole coin or part of the coin.

The apparatus and methods described herein facilitate authentication of coins or other manufactured items, differentiation therebetween and recognition of coins or other manufactured items individually, as a small group or as a large family by generating a digital representation of a feature of the manufactured item. The feature may include structural characteristics including the internal and/or external geometric or morphological characteristics, optionally associated with characteristics of chemical or physicochemical composition, color, structure or others related to their location in space on the subject material element. The structural characteristics used are generally generated by stimulation of a material element and acquired by one or more suitable sensors.

In still another aspect, there is described herein a coin including: a surface feature comprising a first component and a second component, the first component being common to a family of coins and the second component being unique to the coin; wherein the surface feature is undetectable by visual inspection.

Other aspects and features of the present disclosure will become apparent to those ordinarily skilled in the art upon review of the following description of specific embodiments in conjunction with the accompanying figures.

BRIEF DESCRIPTION OF THE DRAWINGS

Embodiments of the present application will now be described, by way of example only, with reference to the attached Figures, wherein.

DETAILED DESCRIPTION

Figure 1:
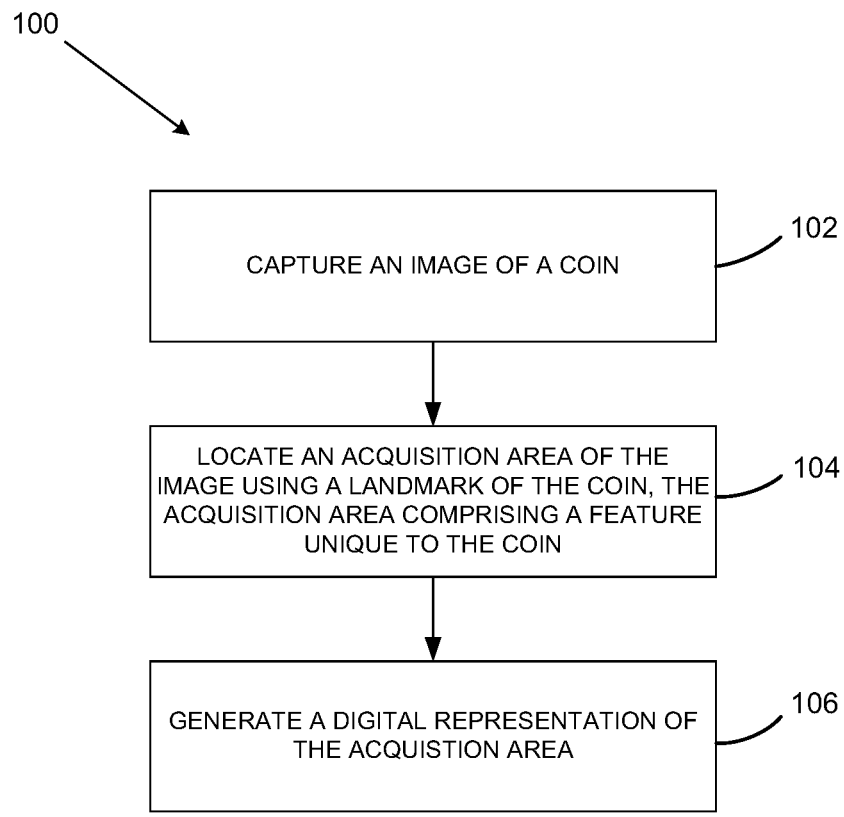
FIG. 1 is a flowchart depicting one example of a method of generating a digital representation of an acquisition area of a coin.

It will be appreciated that for simplicity and clarity of illustration, where considered appropriate, reference numerals may be repeated among the figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, well-known methods, procedures and components have not been described in detail so as not to obscure the embodiments described herein. Also, the description is not to be considered as limiting the scope of the embodiments described herein.

The disclosure generally relates to an apparatus and method of generating a digital representation of a feature of a coin. The feature is unique to the coin, however, may include components that are common to other coins. Methods of registering and authenticating a coin are also described.

The apparatus and methods of present disclosure are not limited to coins and may be applied to any manufactured item by capturing an image of a manufactured item, locating an acquisition area of the image using a landmark of the manufactured item, the acquisition area comprising a feature unique to the manufactured item; and generating a digital representation of the acquisition area. The manufactured item may be a coin made from metals, plastics and polymers, composites, inks, glass, wood or ceramics, for example, or the manufactured item may be a precious metal bar, a precious metal bullion, a precious metal coin, a precious metal wafer, a numismatic coin or a security token, such as a casino token, a toll token, a commercial token and a public transit token, for example. The manufactured items described herein may be produced using a single manufacturing process or multiple manufacturing processes.

FIG. 1 is a flowchart illustrating an example method 100 of generating a digital representation of a feature of a coin. The method may be carried out by software executed by, for example, a processor of a computer. Coding of software for carrying out such a method is within the scope of a person of ordinary skill in the art given the present description. The method may contain additional or fewer processes than shown and described, and may be performed in a different order. Computer-readable code executable by the processor to perform the method, may be stored in a computer-readable medium.

The example method 100 includes capturing 102 an image of a coin, locating 104 an acquisition area of the image using a landmark of the coin, and generating 106 a digital representation of the acquisition area. The acquisition area includes a feature that is unique to the coin. The feature may include a first component, which may be referred to as a common component, meaning that other coins may include the first component as part of their feature, and a second component, which is unique to the manufactured item and may be referred to as a random component. The common component may further be referred to as a family component when the common component is unique to a group of coins manufactured at the same minting facility or manufactured using the same die, for example. The common components may be used to trace the lineage of the coin. The feature and corresponding digital representation may be referred to as a signature of the coin because the overall feature is unique to each coin.

The acquisition area may be located by vector translation or by geometric rotation of the captured image. Multiple acquisition areas corresponding to different components of a feature are also possible. The different components may be common to other coins or unique to a single coin. Parameters for locating the acquisition areas include number or areas, shape and size of the areas. The parameters may be stored in memory and accessed by the processor during generation of the digital representation.

The digital representation is generated by processing the image and includes first and second components that correspond to the common and unique components, respectively, of the feature. The digital representation may alternatively include only a unique component. Processing includes decomposition, which may be linear, in multiple lines, in small pixel form or in x and y lines. The digital representation may be a vector representation of the acquisition area.

In one example, the image is processed using the method described in United States Application No. 2009/0257619 to Boutant et al., which is herein incorporated by reference in its entirety. In this example, a decomposition base is generated and used to extract the random signature from the coin or manufactured item. Using the random and stable part of the signature as a digital representation of a coin, where the stable part indicates that the value may be repeatably found at the acquisition area of the coin, unitary authentication of a coin or the coin family may be achieved. In some embodiments, the random and unstable part of the signature may be used as an index attached to one individual coin and stored in different ways. Other methods for generating a digital representation of the acquisition area of an image are possible as will be understood by persons skilled in the art.

The feature may include components that are included on more than one side of the coin. The feature may be a surface feature including any surface imperfection, defect, or surface anomaly or an internal feature such as an imperfection, defect, anomaly or constitution of the coin material detectable by x-ray or another sensing device, for example. The feature may be random, such as a naturally occurring feature resulting from handling and/or processing during manufacture or may be deterministic, such as an intentionally applied feature produced by one or more of lasering, inscribing, engraving, burnishing, mechanical surface cleaning or touching up, for example. Further, the feature may include a combination of random and deterministic portions. Intentionally applied surface features may be introduced at any step of a manufacturing process or may be introduced in a post-manufacturing step.

The landmark may be any shape, letter, detail or prominent point of localization, such as an engraved point or lasered area, for example. More than one landmark may be used. The acquisition area corresponding to feature components and the landmark may be undetectable by visual inspection of the surface or the acquisition area and landmark may be visually detectable. The location of the acquisition area and the landmark are generally kept confidential to the organization that performs the method in order to provide additional security.

Figure 2:
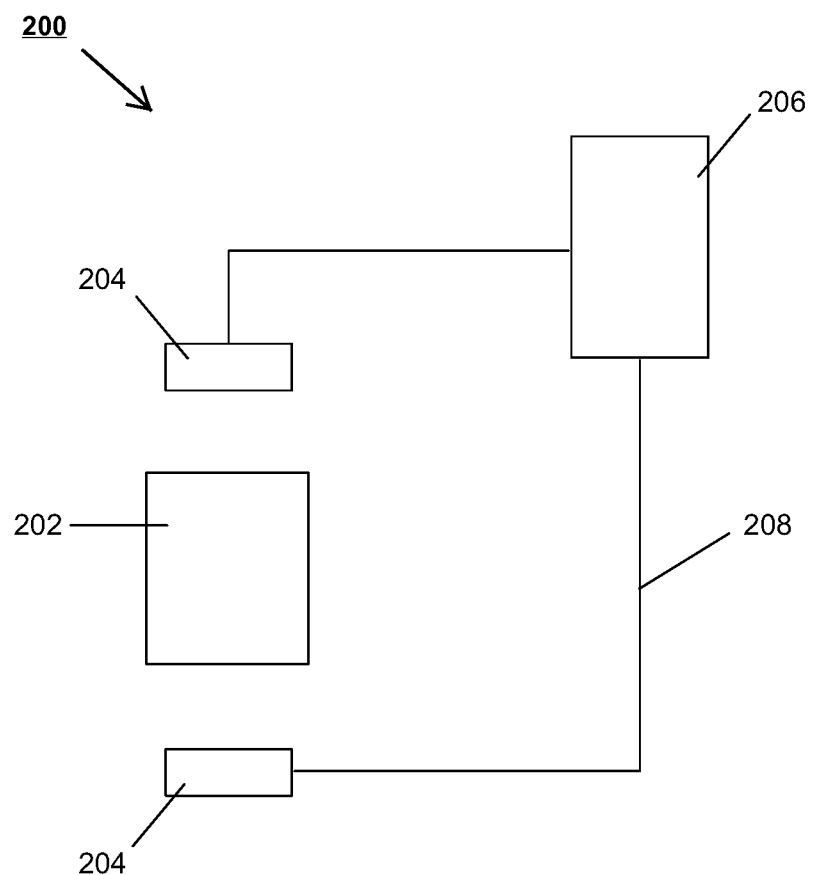
FIG. 2 is an example of an apparatus for performing the method of FIG. 1.

Referring to FIG. 2, an example apparatus for performing the method of FIG. 1 is shown. The apparatus 200 includes a positioning device 202 capable of receiving a coin and maintaining the coin in a position in which a feature of the coin is directed toward one or two sensing devices 204. The sensing devices 204 are generally fixed relative to the positioning device 202 in order to capture images of the coin. The sensing devices 204 are in communication (wired or wireless) with a computer 206 to transmit captured images to the computer 206. The computer 206 includes a processor (not shown) and a memory (not shown). Communication between the sensing devices 204 and the computer 206 may be via electrical cables 208 or may be wireless. The apparatus 200 further includes a light source (not shown) when the lighting in the immediate environment of the apparatus 200 is not sufficient to provide high quality images. The specifications for the light source are selected based on the coin.

The sensing devices 204 used to capture an image may be of an opto-electronic type, x-ray sensitive, infrared sensitive, ultra-violet sensitive and ultrasonic sensitive. In another example, the sensing devices 204 may be scanning electron microscopes. A person skilled in the art will understand that for some types of sensing devices 204, a single sensing device 204 may be used rather than a pair of sensing devices 204.

In yet another example, the sensing devices 204 are digital cameras and the feature is a surface feature of the coin. In this example, the sensing devices 204, when cameras, may include CCD or CMOS sensors and include zoom capability in order to capture magnified images. The magnification is generally set so that coin surface features are visible in detail. In addition, the sensing devices 204, when cameras, may be the same or may be different and one or both of the sensing devices 204, when cameras, may be a video camera. Although two sensing devices 204, when cameras, are shown in FIG. 2, a single sensing device 204 may be used when the surface feature is only located on one side of the manufactured item. When the apparatus 200 includes one sensing device 204, the positioning device 202 maintains the manufactured item in a position in which the surface feature is directed toward the sensing devices 204, when they are cameras. Two cameras as sensing devices 204 may also be used when the surface feature is only on one side of the manufactured item. In this example, determination of the side including the surface feature is not necessary during positioning.

The apparatus 200 is used to generate a digital representation of a feature of a coin for the purpose of registering or authenticating the coin. The apparatus 200 may receive coins one at a time or may include equipment for receiving a large number of coins, such as a hopper and a feeder to deliver each coin to the positioning device.

In use, the computer 206 executes a configuration file, which is stored in memory, in order to execute the method of FIG. 1 effectively. Magnification levels for the sensing devices, lighting conditions and other software and hardware parameters are set prior to execution of the method. The acquisition area may be cropped from a raw image and fed within a specific library to transform the acquisition area into one or more digital representations. The size and shape of the image captured may be specified to match the image boundaries with boundaries of the acquisition area. The configuration file may be generated semi-automatically based on one or more coin samples and software for computing detailed parameters once input relating to the type of coin and the feature components expected is received from the user.

Figure 3:
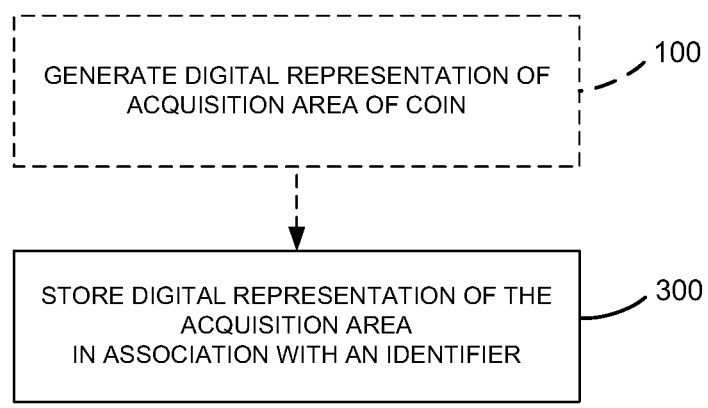
FIG. 3 is a flowchart depicting one example of a method of registering a coin.

An example method of registering a coin is shown in FIG. 3. Similar to the method of FIG. 1, the method of FIG. 3 may be carried out by software executed by, for example, a processor of a computer. Registration is performed following the method of FIG. 1 and includes storing 300 a digital representation of the acquisition area in association with an identifier. The identifier is a numerical code including different portions that correspond to different components of the feature.

The identifier includes a portion associated with a family of the coin and a portion that is unique to the coin. The identifier and digital representation of feature components may be stored in the computer memory. Registration is generally performed in order to catalogue coins for later authentication. Digital representations and associated identifiers are generally stored in a searchable database.

Figure 4:
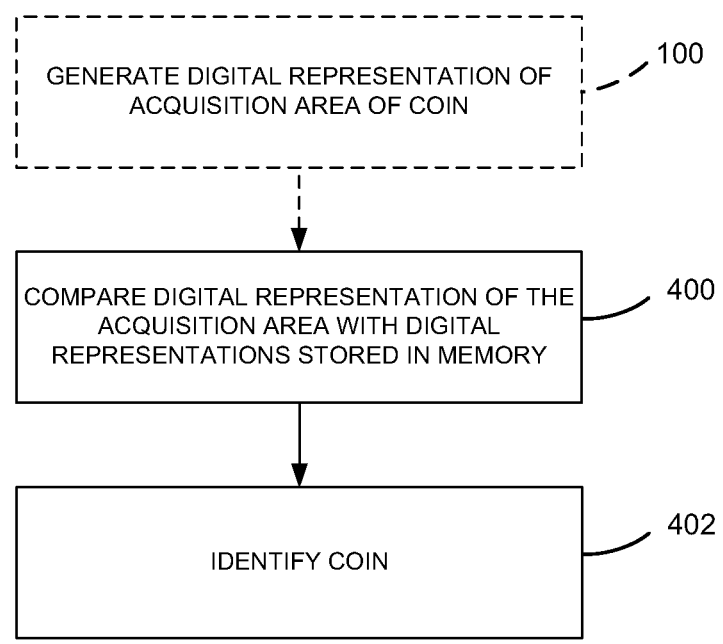
FIG. 4 is a flowchart depicting one example of a method of authenticating a coin.

An example method of authenticating a coin is shown in FIG. 4. Similar to the method of FIG. 1, the method of FIG. 4 may be carried out by software executed by, for example, a processor of a computer. Authentication may be performed following the method of FIG. 1 and includes comparing 400 a digital representation of the acquisition area with digital representations stored in memory and identifying 402 the coin. Identification may include identifying a family to which the coin belongs, identifying a sub-family to which the coin belongs or uniquely identifying the coin. The digital representations may be generated using the method of FIG. 3 or by another method.

The same apparatus may be used for registration and authentication. In order to locate the feature accurately during data collection for registration and data collection for authentication, the areas corresponding to surface feature components are generally sized between 3 and 5 square millimetres or larger. Larger areas may be required depending on the material, colour and size of the coin. If subsequent location of the areas is not within approximately 0.1 to 0.01 mm of the previous location of the area, the digital representation may be compromised. In addition, settings for lighting, sensing devices and positioning devices should correspond between the registration and authentication methods.

Figure 5A:
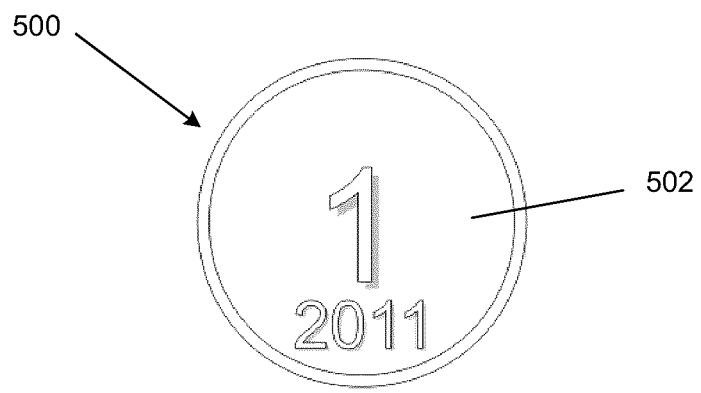
FIG. 5A is a side schematic view of a coin.
Figure 5B:
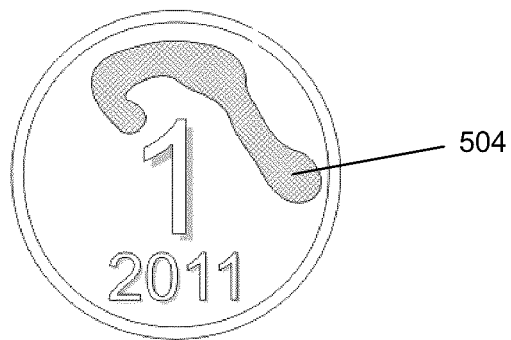
FIG. 5B is a schematic side view of a coin showing an area corresponding to a surface feature.
Figure 5C:
FIG. 5C is a schematic side view of a coin showing areas corresponding to a surface feature.

Reference is made to FIG. 1 with additional reference to FIGS. 5A, 5B and 5C to describe one example of a method of generating a digital representation of a surface feature of a manufactured item. In the present example, the manufactured item is a Canadian one dollar coin 500. According to the example method, an image of a surface 502 of the coin 500 is captured 102, an acquisition area 504 of the image feature unique to the coin is located 104 using a landmark and a digital representation of the acquisition area 504 is then generated 106. As shown in FIG. 5A, the surface feature that uniquely identifies the coin 500 is generally not detectable by inspection, visual or other, because the surface feature is defined in shape and size, for example, by the configuration file. In FIGS. 5B and 5C, acquisition areas 504 are shown for the purpose of this description. In FIG. 5B, the acquisition area 504 includes two sub-areas that are spaced from one another. In FIG. 5C, the first component of the surface feature is a common component, which may be associated with one or more of a matrix, punch or die used to manufacture the coin, and the second component is unique to the coin 500 and may be associated with that coin. The acquisition area is not limited to being on the surface 502, the acquisition area 504 may be provided on the coin edge, or on the opposite surface.

The method of FIG. 1 may be performed using the apparatus 200 of FIG. 2, which may further include an approximately 1 ton capacity hopper for vibrating the coins into a vertical tube. The coins may 25 then be fed into a star wheel, which moves the coins in front of the two sensing devices 204, when they are cameras. The star wheel controls the spacing of the coins, the time that the coins spend in front of the "cameras" and, therefore, the speed of the apparatus 200. The sensing devices 204, when cameras, include lighting to achieve the proper lighted background, which facilitates capture of a clear image of the coin surface.

Figure 6:
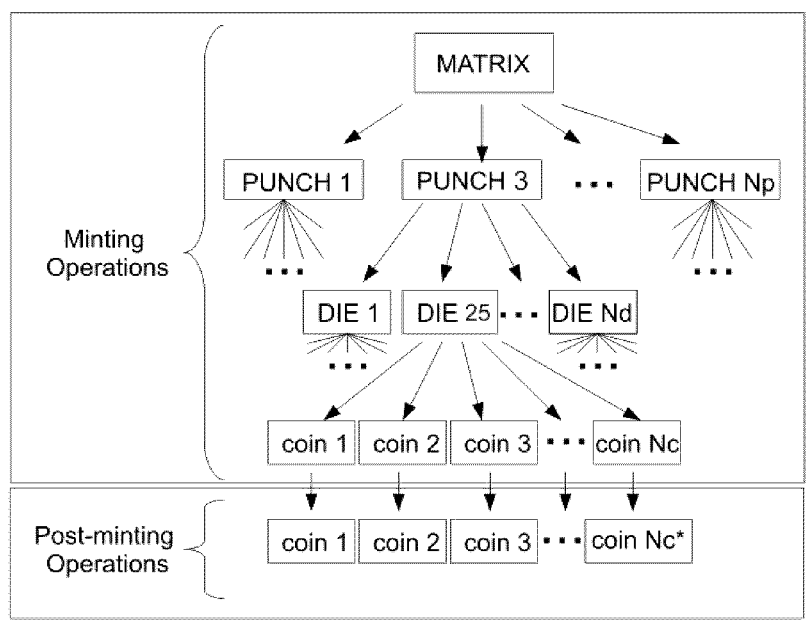
FIG. 6 is a family diagram of a coin.

FIG. 6 shows the progression of the tooling characteristics, which may form part of the surface feature of the coin. A coin is manufactured using a die. Each die has its own metallurgical physiochemical characteristic and is capable of producing a particular imprint, which may be referred to as a parent imprint. The imprint is present on all of the coins manufactured using the die. A die is manufactured using a punch. All of the dies manufactured from a particular punch have the unique metallurgical physiochemical characteristics of that punch. Therefore, the dies and the coins produced using the dies include imprints of the punch, which may be referred to as the grandparents' imprints. Punches are fabricated from a matrix which has its own metallurgical physiochemical characteristics. The characteristics of the matrix are imprinted on the punch and may be referred to as great-grandparent's imprints.

The surface feature of a coin may include characteristics from each stage of tooling, or may include characteristics from a single stage in addition to the unique component of the coin. The characteristics may be innocuous marks on the tooling, such as engraving details, laser engraving details produced intentionally, or natural manufacturing marks, such as steel scratches, steel imperfections, engraving touch-ups or mechanical damages due to handling or processing or other defects.

As shown, tooling begins with a starting matrix, M1. A punch P3 is made from the matrix with a change of the year date, every year. The same matrix may be used for 20 or more years. In the example of FIG. 6, the punch is in its third year of use. Any number of dies may be manufactured from a punch. In the example of FIG. 6, between 50 and 800 dies are made from the punch P3 and die 25 is used to strike a volume of coins per year. The die life is generally between 50,000 to more than 2 million coins produced per die.

Coins may also be subjected to post-minting operations, as indicated in FIG. 6. Post-minting operations are generally performed prior to the coins being released to the public and include, painting, engraving including laser engraving, coating with different materials or substrates, or individual coding, for example, which may result in an additional component of the surface feature.

An example identifier for the ten thousandth coin made from die 25 may be MPDCX132510000Y132510000, which is determined as follows:

| Matrix | M1 | M1X1Y1 |
| Punch | P3 | MPX13Y13 |
| Die | D25 | MPDX1325Y1325 |
| Coin | 10,000$^{th}$ | MPDCX132510000Y132510000 |

Figure 7:
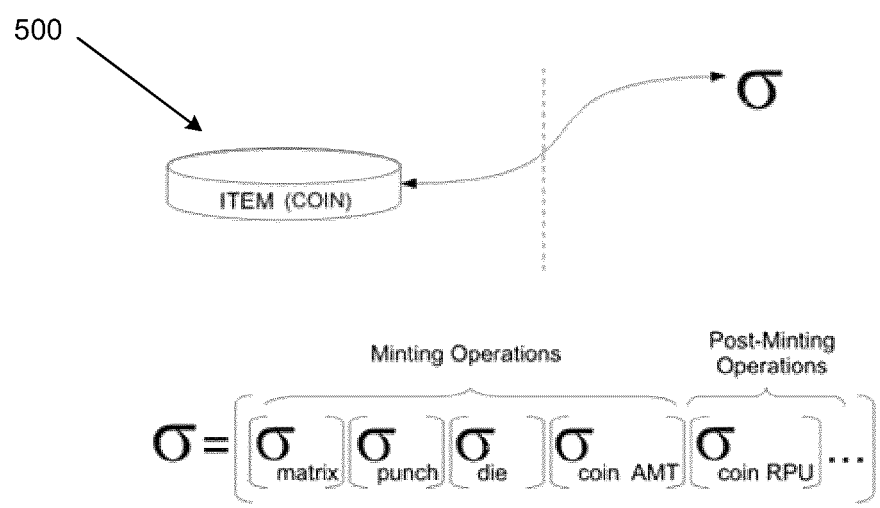
FIG. 7 is a schematic diagram depicting an identifier associated with a coin.

FIG. 7 shows the relationship between a coin 500 and a coin identifier, which is stored in a memory of a computer. The identifier includes one or more portions that correspond to a family, such as matrix, punch or die families, and a portion that corresponds to the coin. The portion that corresponds to the coin may be an existing surface feature of the coin, which is present in a coin as minted today (AMT), or a surface feature that is applied following manufacture of the coin when the coin is ready for public use (RPU).

Reference is made to FIG. 3 with reference back to FIGS. 5B and 5C to describe one example of a method of registering a coin. Registration is typically performed by a government agency following coin manufacture. In the example registration method, following generation of a digital representation of the acquisition area 504 of the coin, the digital representation is stored in association with an identifier. The identifier may include one or more portions corresponding to the matrix, the punch or the die as well as a portion corresponding to the coin. In FIG. 5C, one sub-area of the acquisition area 504 corresponds to the component of the surface feature that is associated with the die and the sub-area of the acquisition area 504 corresponds to the component of the surface feature that is unique to the coin.

Registration may be performed using the apparatus of FIG. 2, which may have a capacity of up to 400 coins per minute or greater.

Figure 8:
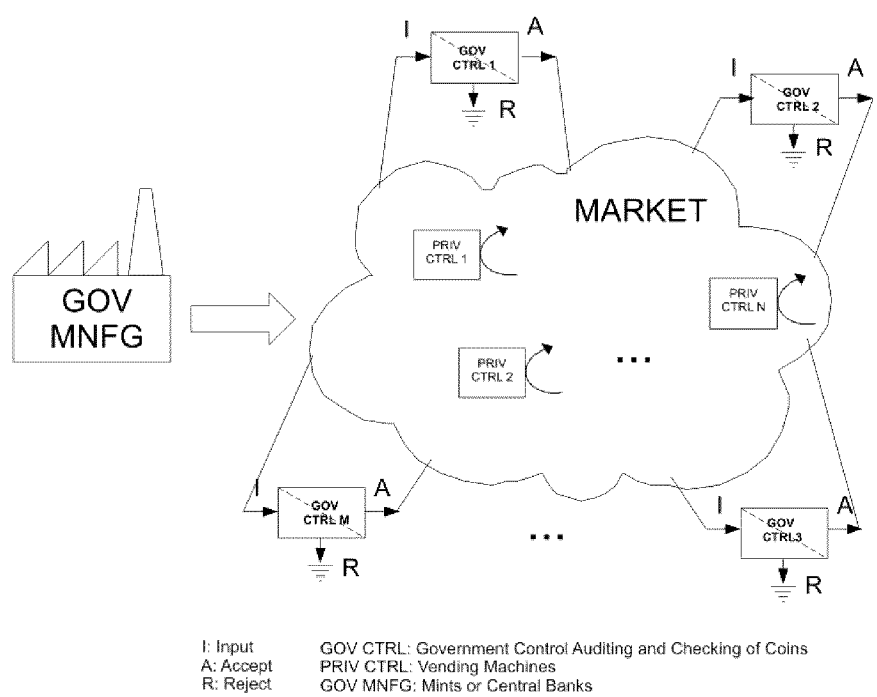
FIG. 8 is a schematic diagram illustrating example applications of an apparatus for generating a digital representation of an acquisition area of a coin.

Reference is made to FIG. 4 with reference again to FIGS. 5B and 5C to describe one example of a method of authenticating a coin. Authentication may be performed by i) vending machines in order to verify that coins are not counterfeit before accepting the coins in exchange for goods or services; ii) banks in order to verify that coins are not counterfeit before releasing the coins back to the public for re-use; and iii) coin processors in order to verify that coins are not counterfeit prior to sorting, rolling and wrapping coins. FIG. 8 depicts release of a coin into the public and coin authentication points, and the manufacturing mint or plant in order to ensure that coins pass quality control according to the standards established by management or by customers.

Following generation of a digital representation of the acquisition area 504 of the coin 500, the digital representation is compared 400 with digital representations stored in memory that were generated using the registration method of FIG. 3. When a match is found, the coin may be identified 402. In FIG. 5C, the sub-area of the acquisition area 504, which corresponds to the component of the surface feature that is associated with the die, and the sub-area of the acquisition area 504, which corresponds to the component of the surface feature that is unique to the coin, are included in the identifier. The coin may be identified uniquely or may be identified as being part of a matrix, punch or die family. The level of identification may be selected by the user. When family identification is performed, the authentication method generally identifies the coin by outputting a pass or fail result or by outputting the type or denomination of the coin. When the authentication method is performed by a bank, coins that pass authentication are returned to circulation and the coins that fail authentication are determined to be counterfeit and are not returned to circulation.

When the authentication method is performed by a vending machine, for example, the coin is identified in order to determine the monetary value of the coin. This type of identification may also be referred to as coin recognition, which is also useful during coin sorting and quality control inspection. When the authentication method is performed for quality control purposes, coins that pass authentication are considered to meet the quality standards; this applies to circulation, numismatic, bullion, and ancient time dated coins.

A match may be determined when the digital representation of the coin being authenticated is statistically the same as the digital representation of a coin in the database.

In one example, Hamming distances are determined and the mean and the standard deviation are compared to obtain Gaussian curves of distributions repartition. The studied variable being Gaussian, the standard deviation allows the determination of the population around the mean value. The more widely distributed the values, the more the standard deviation is large, and vice versa. A threshold of authenticity is provided in order to determine whether a coin should be accepted or rejected.

After spending time in circulation, coins are often worn and may have lost some surface details. Benchmarks to evaluate the coin surface degradation and the wear of the coin surface details may be provided. When the threshold is exceeded the coin may be rejected as being too damaged. However, a coin having surface features that are partially degraded may still be accepted. The authentication method may further replace the digital representation that is stored in the database with a more recent digital representation in order to extend the life of the coin.

Since there may be millions of coins in circulation at any one time, different levels of matching may facilitate coin authentication. Identification of a coin based on matrix, punch or die family may be performed based on indexing. Information relating to indexes and other processing parameters may be stored in memory in association with the area parameters for the surface feature components. When the coin identifier includes only die and coin portions, such as DCX2510000Y2510000, for example, the search may be limited to the group of identifiers having a die index 25. The search excludes identifiers of coins made from dies other than die 25. As such, the time to complete the search may be significantly reduced. If the die portion of the identifier does not include the die family, the coin will be rejected.

Figure 9:
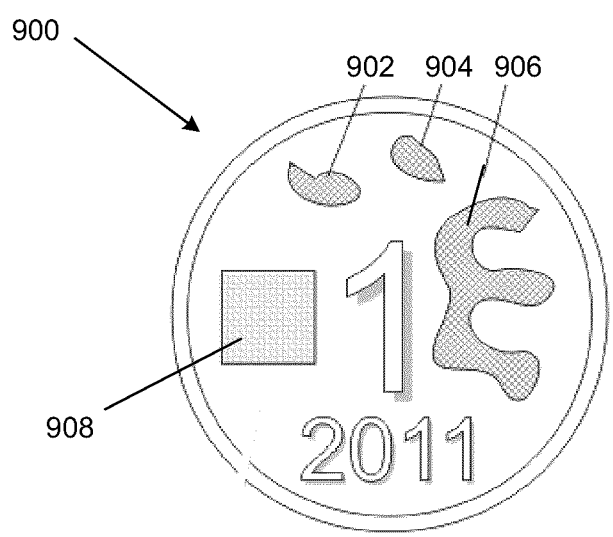
FIG. 9 is a schematic side view of a coin showing areas corresponding to a surface feature.

In another example, the identifier associated with the surface feature of a coin is included as part of the coin. Referring to FIG. 9, a coin 900 includes areas 902, 904 and 906, which correspond to components of a surface feature of the coin 900 and, together, make up the acquisition area. For example, area 902 may correspond to a die component of the surface feature, area 904 may correspond to a punch component of the surface feature and area 906 may correspond to a coin component of the surface feature. Embedded identifier 908 may be a RF (Radio Frequency) chip embedded in the coin or an engraved or printed indication of the identifier associated with the surface feature applied to the coin. In addition, the embedded identifier may be optionally ciphered by methods known to those skilled in the art.

When authentication is performed for a coin having an embedded identifier 908, the comparison is one-to-one and access to a database of digital representations is not required. Following generation of a digital representation of the areas 902, 904 and 906 of the coin, an identifier corresponding to the digital representation is determined and then compared to the embedded identifier in order to determine if there is a match. If the embedded identifier and the identifier do not match, the coin is rejected as being counterfeit. Authentication speed is faster than may be achieved using the method of FIG. 4 and may be as fast as one or two hundredths of a second.

Metal bullions, coins, wafers and numismatic coins typically have a high commercial value. Because visible surface damage may reduce the commercial value, registration and authentication may be performed manually or semi-automatically in order to avoid any damage caused by machine handling. The volume of metal bullions, coins, wafers and numismatic coins is significantly less than the volume of currency coins, therefore, the items may be placed on trays or moved by pick and place robotic means from one place to another for image capture and surface recognition. The digital cameras may be mobile to facilitate image capture while the items are fixed in one position, or the cameras may be stationary and the items may be moved. For high value items such as metal bullions, coins, wafers and numismatic coins, features such as surface defects may be avoided because such defects may detract from the commercial value of the items.

Registration and authentication of metal bars may be performed by manually handling the bars. A portable device having a camera for capturing an image of the surface of the bar may be used. The portable device may include data transmission capability to transfer the image for remote processing. Alternatively, a conveyor may be provided to move the bars past a camera fixed above the conveyor.

Because coins and other manufactured items may be damaged during handling, an advantage of the apparatus and methods disclosed herein is that the location of the surface feature may be chosen in order to avoid known wear points on the coins and other manufactured items. This may increase the life of the coins or other manufactured items.

In addition, surface features may be selected to resist wear so that after years of handling, identifiers may still be associated with the manufactured items so that the items may be authenticated.

The methods described herein further provide increased security because the areas corresponding to the surface feature are very difficult to locate and determine and therefore, are not easily duplicated for counterfeiting purposes.

The above-described embodiments are intended to be examples only. Alterations, modifications and variations can be effected to the particular embodiments by those of skill in the art without departing from the scope of the present application, which is defined solely by the claims appended hereto.

What is claimed is:

1. A method of authenticating a coin, the method comprising:
   capturing an image of the coin using a digital camera;
   locating an acquisition area of the image using a landmark of the coin, the acquisition area comprising a surface feature of the coin, the surface feature comprising an imprint produced by at least one of a die, a punch, or a matrix used to manufacture the coin, wherein other coins produced by the at least one of the die, the punch, or the matrix also comprise the surface feature comprising the imprint;
   generating a digital representation of the acquisition area; and
   either:
   storing the digital representation in a database in association with an identifier that identifies the at least one of the die, the punch, or the matrix used to manufacture the coin and the other coins; or
   comparing the digital representation to other digital representations stored in a database in order to determine a match, thereby identifying the at least one of the die, the punch, or the matrix used to manufacture the coin, wherein the match is determined when the digital representation and one of the other digital representations stored in the database are similar beyond a threshold, and wherein the one of the other digital representations is stored in the database in association with the identifier that identifies the die, the punch, or the matrix used to manufacture the coin and the other coins.

2. The method according to claim 1 wherein an identity of the landmark or acquisition area is undetectable by visual inspection of the coin.

3. The method according to claim 1 wherein the surface feature comprises a first component and a second component different from the first component, the first component being a random component unique to the coin, the second component comprising the imprint produced by the at least one of the die, the punch, or the matrix used to manufacture the coin.

4. The method according to claim 3, comprising storing the digital representation in the database in association with the identifier that identifies the at least one of the die, the punch, or the matrix used to manufacture the coin, wherein the identifier further identifies the coin uniquely.

5. The method according to claim 3, comprising comparing the digital representation to the other digital representations stored in the memory in order to determine the match, thereby identifying the at least one of the die, the punch, or the matrix used to manufacture the coin, and identifying the coin uniquely.

6. The method according to claim 3 wherein the acquisition area comprises a first sub-area and a second sub-area different from the first sub-area, wherein the first sub-area contains the first component and the second sub-area contains the second component.

7. The method according to claim 1 wherein the acquisition area comprises a plurality of sub-areas, wherein each sub-area contains a component of the surface feature corresponding to a different one of the die, the punch, and the matrix.

8. The method according to claim 1 wherein the imprint comprises characteristics produced by engraving details on the die, the punch, or the matrix.

9. The method according to claim 1 wherein the imprint comprises characteristics produced by natural manufacturing marks on the die, the punch, or the matrix caused by scratches, imperfections, engraving touch-ups, or mechanical handling damage.

10. The method according to claim 1 comprising storing the digital representation in the database in association with the identifier that identifies the at least one of the die, the punch, or the matrix used to manufacture the coin, wherein the digital representation is a first digital representation, the method comprising,
following wear or damage to the surface feature of the coin:
capturing a second image of the coin using the digital camera;
locating the acquisition area of the second image using the landmark of the coin;
generating a second digital representation of the acquisition area; and
storing the second digital representation in the database in association with the identifier that identifies the at least one of the die, the punch, or the matrix used to manufacture the coin.

11. The method according to claim 10, wherein storing the second digital representation in the database comprises replacing the first digital representation in the database in association with the identifier that identifies the at least one of the die, the punch, or the matrix used to manufacture the coin.

12. The method according to claim 10, comprising:
capturing a third image of the coin using the digital camera;
locating the acquisition area of the third image using the landmark of the coin; generating a third digital representation of the acquisition area; and
comparing the third digital representation to other digital representations stored in the database in order to determine a match, wherein the other digital representations comprise the first digital representation and the second digital representation, wherein a match is determined when the third digital representation is similar beyond a threshold to either the first digital representation or the second digital representation, thereby identifying the at least one of the die, the punch, or the matrix used to manufacture the coin.

13. The method according to claim 1, wherein a location of the surface feature of the coin is selected in order to avoid wear points on the coin.

14. An apparatus for authenticating a coin, the apparatus comprising:
a light source;
a digital camera for capturing an image of the coin;
a positioning device for maintaining a position of the coin during the capturing of the image of the coin; and
a processor configured:
to control the digital camera to capture the image of the coin;
to locate an acquisition area of the image using a landmark of the coin, the acquisition area comprising a surface feature of the coin, the surface feature comprising an imprint produced by at least one of a die, a punch, or a matrix used to manufacture the coin, wherein other coins produced by the at least one of the die, the punch, or the matrix also comprise the surface feature comprising the imprint;
to generate a digital representation of the acquisition area; and
either:
to store the digital representation in a database in association with an identifier that identifies the at least one of the die, the punch, or the matrix used to manufacture the coin and the other coins; or
to compare the digital representation to other digital representations stored in a database in order to determine a match, thereby identifying the at least one of the die, the punch, or the matrix used to manufacture the coin, wherein the match is determined when the digital representation and one of the other digital representations stored in the database are similar beyond a threshold, and wherein the one of the other digital representations is stored in the database in association with the identifier that identifies the die, the punch, or the matrix used to manufacture the coin and the other coins.

15. The apparatus according to claim 14, wherein the processor is configured to store the digital representation in the database in association with the identifier that identifies the at least one of the die, the punch, or the matrix used to manufacture the coin, wherein the digital representation is a first digital representation, and wherein the processor is configured, following wear or damage to the surface feature of the coin:
to capture a second image of the coin using the digital camera;
to locate the acquisition area of the second image using the landmark of the coin;
to generate a second digital representation of the acquisition area; and
to store the second digital representation in the database in association with the identifier that identifies the at least one of the die, the punch, or the matrix used to manufacture the coin.

16. A non-transitory computer-readable medium comprising instructions executable by a processor for implementing the method according to claim 1.

17. The apparatus according to claim 14, wherein the surface feature comprises a first component and a second component different from the first component, the first component being a random component unique to the coin, the second component comprising the imprint produced by the at least one of the die, the punch, or the matrix used to manufacture the coin.

18. The apparatus according to claim 17, wherein the processor is configured to store the digital representation in the database in association with the identifier that identifies the at least one of the die, the punch, or the matrix used to manufacture the coin, wherein the identifier identifies the coin uniquely.

19. The apparatus according to claim 17, wherein the processor is configured to compare the digital representation to the other digital representations stored in the database in order to determine the match, thereby identifying the at least one of the die, the punch, or the matrix used to manufacture the coin, and identifying the coin uniquely.

20. The apparatus according to claim 14, wherein the acquisition area comprises a plurality of sub-areas, wherein each sub-area contains a component of the surface feature corresponding to a different one of the die, the punch, and the matrix.

* * * * *